United States Patent
Chang et al.

(10) Patent No.: US 9,659,396 B1
(45) Date of Patent: May 23, 2017

(54) CLOTHWARP RIGGING CLOTH

(71) Applicant: Pixar, Emeryville, CA (US)

(72) Inventors: Edwin Chang, Emeryville, CA (US);
Chris Griffin, Walnut Creek, CA (US);
David Lally, San Francisco, CA (US)

(73) Assignee: Pixar, Emeryville, CA (US)

( * ) Notice: Subject to any disclaimer, the term of this patent is extended or adjusted under 35 U.S.C. 154(b) by 233 days.

(21) Appl. No.: 13/799,602

(22) Filed: Mar. 13, 2013

Related U.S. Application Data (60) Provisional application No. 61/664,376, filed on Jun. 26, 2012.

(51) Int. Cl.
*G06T 13/20* (2011.01)

(52) U.S. Cl.
CPC .................................. *G06T 13/20* (2013.01)

(58) Field of Classification Search
None
See application file for complete search history.

(56) References Cited

U.S. PATENT DOCUMENTS

| | | | | |
|---|---|---|---|---|
| 6,909,431 | B1* | 6/2005 | Anderson et al. | 345/473 |
| 2002/0118197 | A1* | 8/2002 | Baraff et al. | 345/474 |
| 2003/0088389 | A1* | 5/2003 | Balaniuk | G06F 17/5018 703/2 |
| 2007/0085851 | A1* | 4/2007 | Muller et al. | 345/474 |
| 2011/0292053 | A1* | 12/2011 | Wang | G06T 13/20 345/473 |

OTHER PUBLICATIONS

Cutler et al., An art-directed wrinkle system for CG character clothing and skin, 2006, Elsevier.*
O'Brien et al, Dynamic Simulation of Splashing Fluids, 1995, Proceedings of Computer Animation.*
Feng et al, A Deformation Transformer for Real-Time Cloth Animation, 2010, ACM.*
Magnenat-Thalmann, Nadia, et al. "Modeling of bodies and clothes for virtual environments." Cyberworlds, 2004 International Conference on. IEEE, 2004.*
Rohmer et al ("Animation Wrinkling: Augmenting Coarse Cloth Simulations with Realistic-Looking Wrinkles", 2010, ACM).*

* cited by examiner

*Primary Examiner* — Kee M Tung
*Assistant Examiner* — Xin Sheng
(74) *Attorney, Agent, or Firm* — Kilpatrick Townsend & Stockton LLP (57) ABSTRACT

Simulating cloth garments can be a large challenge that requires both directability as well as stability. In various embodiments, cloth garments can be animated using a technique called "Clothwarp." Clothwarp assists garment animation through methods of cloth articulation and simulation targeting. In one aspect, Clothwarp grants another level of directable control on simulation, allowing the artist to modify the influence of the warp, both as a target input into the simulation and as a cleanup tool on simulation results.

21 Claims, 6 Drawing Sheets

FIG. 6

CLOTHWARP RIGGING CLOTH

CROSS-REFERENCE TO RELATED APPLICATIONS

This Application claims the benefit of and priority to U.S. Provisional Application No. 61/664,376, filed Jun. 26, 2012 and entitled "Clothwarp Rigging Cloth" which is hereby incorporated by reference for all purposes.

BACKGROUND

This disclosure relates to computer-generated imagery (CGI) and computer-aided animation. More specifically, this disclosure relates to techniques for rigging cloth for use in CGI and computer-aided animation.

With the wide-spread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects. These virtual models can then be manipulated using computers to, for example, simulate physics, design aesthetic actions such as poses or other deformations, crate lighting, coloring and paint, or the like, of characters or other elements of a computer animation display.

Pixar is one of the pioneering companies in the computer-generated imagery (CGI) and computer-aided animation industry. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms and tools specially designed for computer-aided animation and CGI. One such example is now known as PhotoRealistic RenderMan, or PRMan for short. PRMan is a photorealistic RenderMan-compliant rendering software system based on the Render-Man Interface Specification (RISpec) which is Pixar's technical specification for a standard communications protocol (or interface) between 3D computer graphics programs and rendering programs. PRMan is produced by Pixar and used to render their in-house 3D animated movie productions. It is also available as a commercial product licensed to third parties, sold as part of a bundle called RenderMan Pro Server, a RenderMan-compliant rendering software system developed by Pixar based on their own interface specification. Other examples include tools and plug-ins for programs such as the AUTODESK MAYA high-end 3D computer graphics software package from AutoDesk, Inc. of San Rafael, Calif.

One core functional aspect of PRMan can include the use of a "rendering engine" to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. In some instances, the geometric description of the objects may include a number of animation control variables (avars) and values for the avars. An animator may also pose the objects within the image or sequence and specify motions and positions of the objects over time to create an animation.

As such, the production of CGI and computer-aided animation may involve the extensive use of various computer graphics techniques to produce a visually appealing image from the geometric description of an object that may be used to convey an essential element of a story or provide a desired special effect. One of the challenges in creating these visually appealing images can be the balancing of a desire for a highly-detailed image of a character or other object with the practical issues involved in allocating the resources (both human and computational) required to produce those visually appealing images.

Therefore, one issue with the production process is the time and effort involved when a user undertakes to model the geometric description of an object and the model's associated avars, rigging, shader variables, paint data, or the like. It may take several hours to several days for the user to design, rig, pose, paint, or otherwise prepare a model that can be used to produce the visually desired look. This involvement in time and effort can limit that ability of the user to create enough variants of the model for use in different stages of the production process or in a single scene to convey particular element of the story or to provide the desired visual effect. Additionally, artistic control over the look of a model or its visual effect when placed in a scene may also be lost by some attempts at reducing the time and effect in preparing a model that rely too much on automated procedural creation of models.

Accordingly, what is desired is to solve one or more of the problems relating to rigging cloth for use in CGI and computer-aided animation, some of which may be discussed herein. Additionally, what is desired is to reduce some of the drawbacks relating to rigging cloth for use in CGI and computer-aided animation, some of which may be discussed herein.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Simulating cloth garments can be a large challenge that requires both directability as well as stability. In various embodiments, cloth garments can be animated using a technique called "Clothwarp." Clothwarp assists garment animation through methods of cloth articulation and simulation targeting. In one aspect, Clothwarp grants another level of directable control on simulation, allowing the artist to modify the influence of the warp, both as a target input into the simulation and as a cleanup tool on simulation results.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 2 is a simplified flowchart of a method for cloth-warping in one embodiment.

DETAILED DESCRIPTION

Figure 1:
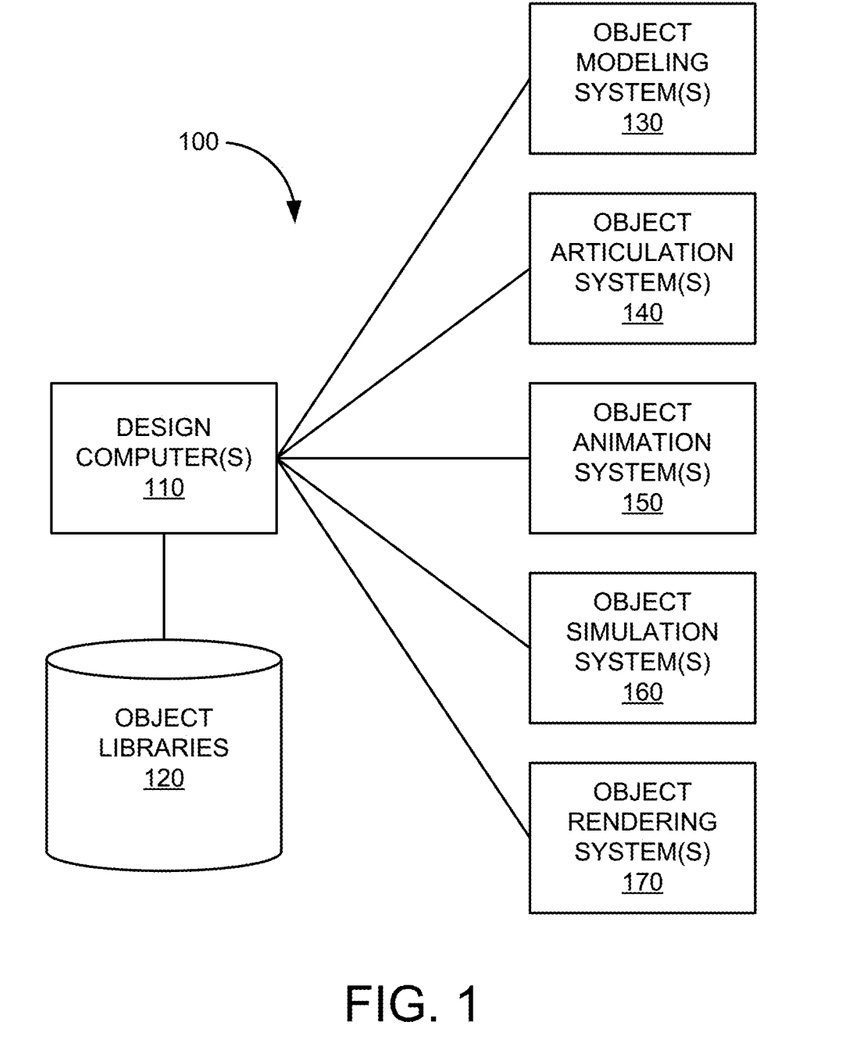
FIG. 1 is a simplified block diagram of a system for creating computer graphics imagery (CGI) and computer-aided animation that may implement or incorporate various embodiments or techniques for cloth animation.

FIG. 1 is a simplified block diagram of system 100 for creating computer graphics imagery (CGI) and computer-aided animation that may implement or incorporate various embodiments or techniques for garment animation. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for cloth animation.

Clothwarp is a technique that does what its name implies; it warps cloth. In various embodiments, a subdivision warp deformer is used to project a garment mesh to follow a corresponding reference or target mesh, such as a character's skin mesh. Clothwarp can be implemented on a global scale by building its components upon modular aspects of character and garment rigs. This allowed for the Clothwarp system to be easily distributed to all characters of varying proportions and, having Clothwarp installed universally, a production group has the option to forgo simulation on large portions of background crowd characters, while maintaining cloth that followed the underlying animation. When simulation is required, Clothwarp can act as an input to help direct the simulation.

Figure 2:
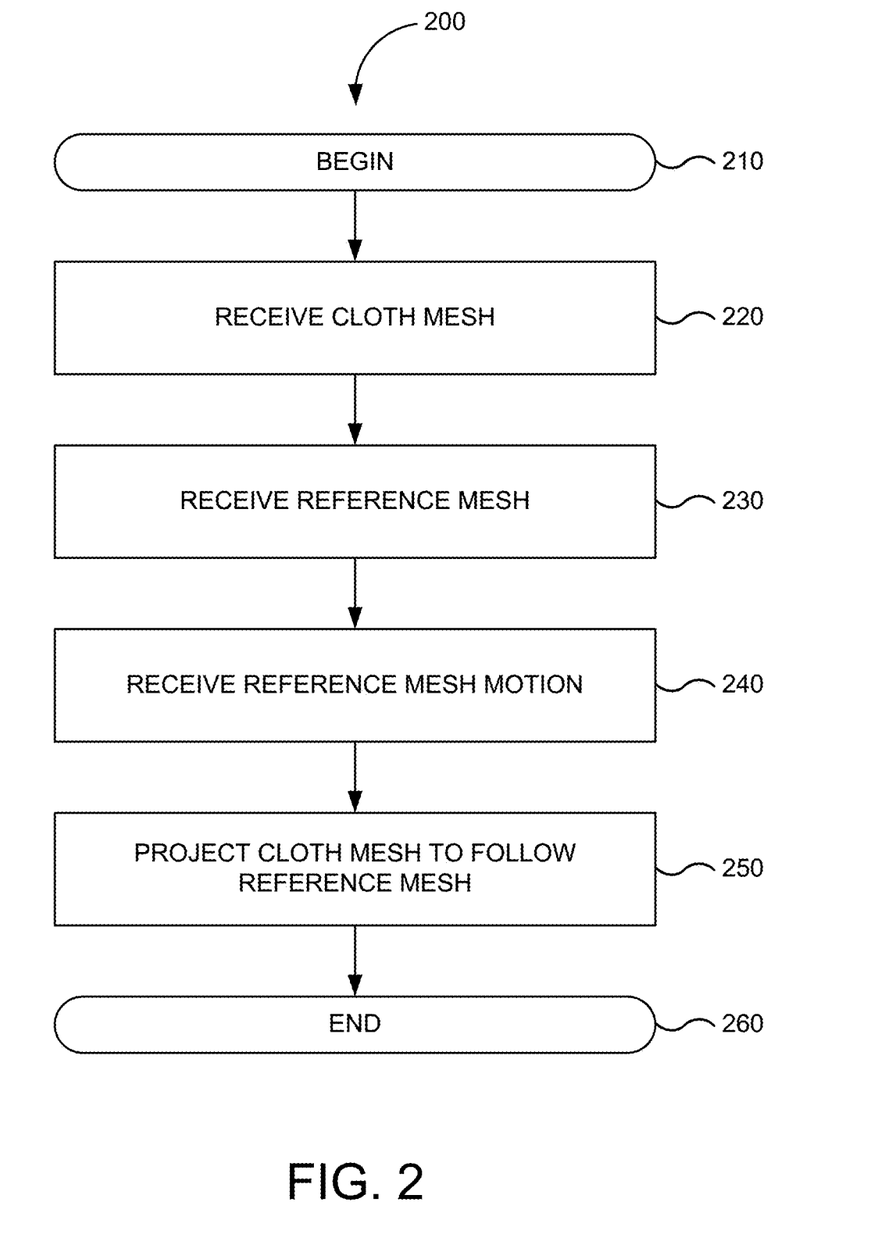

FIG. 2 is a simplified flowchart of method 200 for clothwarping in one embodiment. Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

In step 220, a cloth mesh is received. In step 230, a reference mesh or target mesh is received. In some embodiments, the reference or target mesh may be a modification or simplification of another related mesh to provide higher quality warped cloth. For example, to circumvent an issue of having a character's individual legs cause a shearing effect, a new reference or target mesh can be created identical to the character mesh in certain portions, but with a tube-like shape extending where the desired cloth mesh is to cover.

In step 240, reference motion is received. For example, an animator may specify the motion and position over time of the tube region of the mesh to allow for a blended interpolation of target points between the character's legs. In step 250, the cloth mesh is projected to follow the reference mesh. With an intermediary target mesh, the warp deformer can produce smoother results in various aspects.

Method 200 of FIG. 2 ends in step 260.

Figure 3:
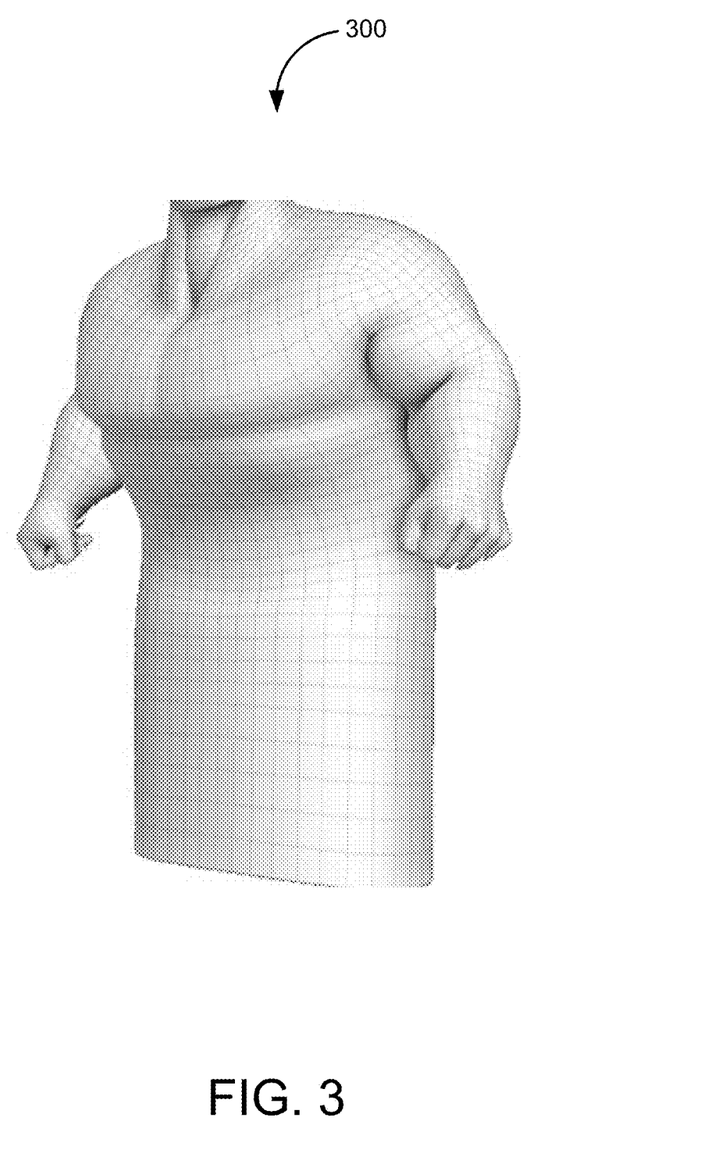
FIG. 3 is an illustration of an intermediary target mesh used with clothwarping in one embodiment.

FIG. 3 is an illustration of intermediary target mesh 300 used with clothwarping in one embodiment. In various embodiments, rigging of an animated mesh (not shown) drives intermediary target mesh 300. A subdivision warp deformer drives a cloth mesh in various aspects in response to intermediary target mesh 300.

In some aspects, one common problem for simulation is dealing with physically unrealistic character motion. With the help of Clothwarp, simulations can be stabilized through simulation targeting.

Figure 4:
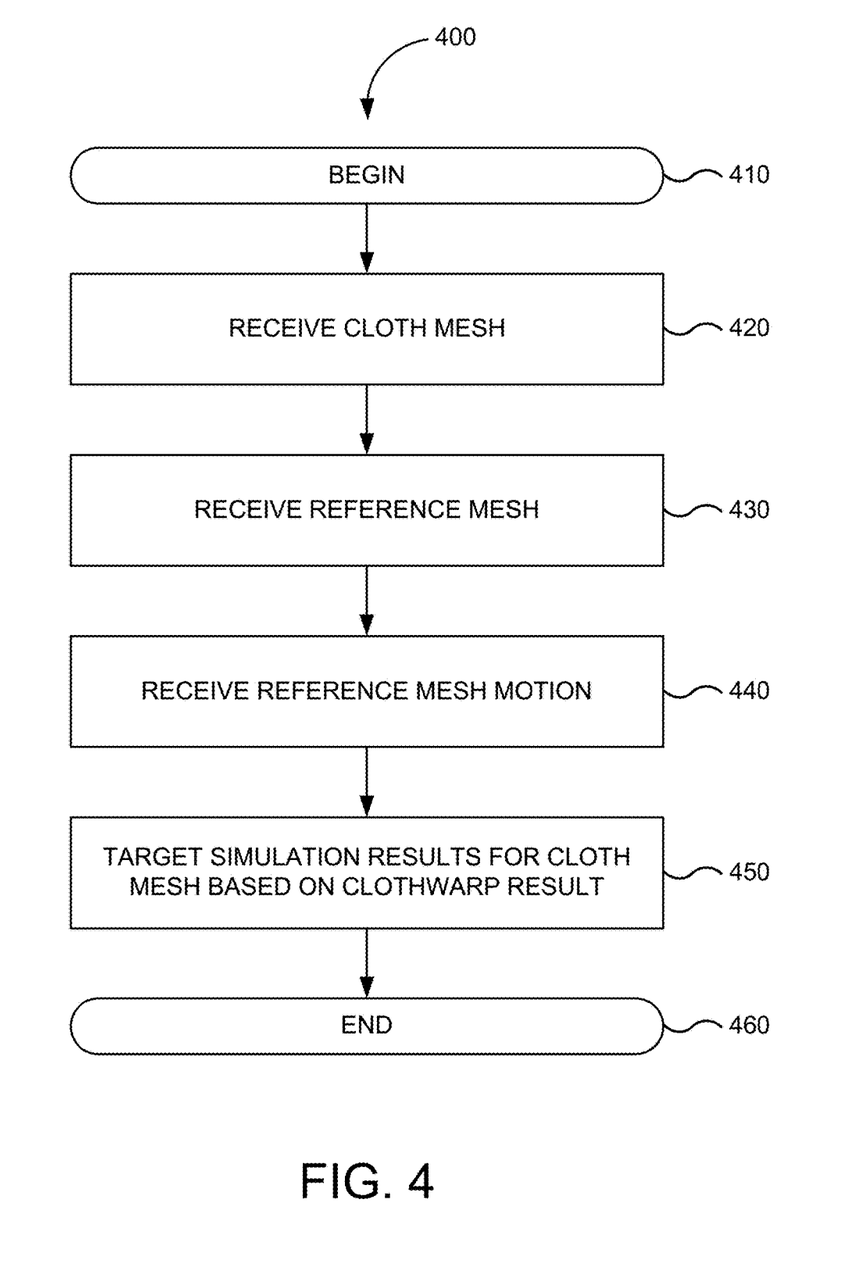
FIG. 4 is a simplified flowchart of a method for simulation targeting in one embodiment.

FIG. 4 is a simplified flowchart of method 400 for simulation targeting in one embodiment. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, a cloth mesh is received. In step 430, a reference mesh or target mesh is received. In step 440, reference motion is received. In step 450, a simulation is targeted based on the cloth mesh being projected to follow the reference mesh. For example, during a shot featuring high velocity animation, the simulation could be targeted to follow the Clothwarp through spring forces, helping stabilize the simulation while preserving simulated ballistic motion. In another aspect, the Clothwarp could also be used as a guide for velocity-relative drag to reduce jitter or oozing results. Since this type of targeting was relative to simulated positions instead of acting as a direct force, it could still provide useful control even when the state of simulation differed from the Clothwarp target.

In further embodiments, Clothwarp influence parameters can be setup for secondary character garments, allowing for stable, fully simulated garment motion to be achieved "out of the box," even during sequences featuring high velocity motion. In one experiment, nearly two hundred fighting on-screen characters were produced to have fully simulated garments that were achieved with minimal per-shot adjustment.

Method 400 of FIG. 4 ends in step 460.

In further embodiments, Clothwarp can also be used in post-simulation editing. For example, after a simulation is run, an artist can still have the capability to blend the results of specific regions of a garment mesh between the simulation or the Clothwarp. This greatly increased the speed of miscellaneous shot cleanup, when the artist might have otherwise needed to designate a parameter adjustment and run a new simulation.

Figure 5:
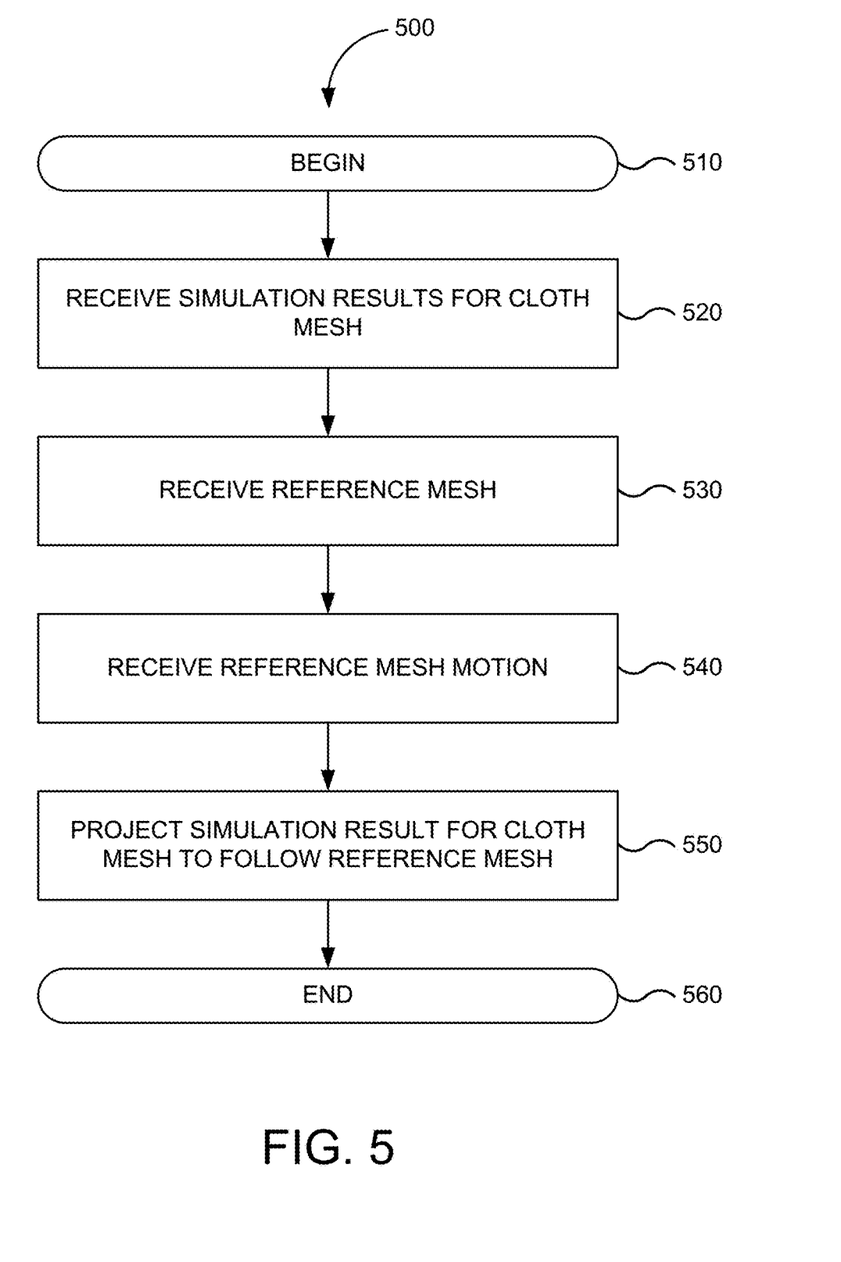
FIG. 5 is a simplified flowchart of a method for post-simulation editing in one embodiment.

FIG. 5 is a simplified flowchart of method 500 for post-simulation editing in one embodiment. Implementations of or processing in method 500 depicted in FIG. 5 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 500 depicted in FIG. 5 begins in step 510.

In step 520, simulation results for a cloth mesh are received. In step 530, a reference mesh or target mesh is received. In step 540, reference motion is received. In step 550, the simulation result projected to follow the reference mesh. In one aspect, in addition to one Clothwarp for a character, a new Clothwarp could be generated in a per-shot context using the pose of the character and a garment's simulation results at a specific point in time. This enabled an artist to preserve the shape and wrinkles generated by simulation and progress it from that point forward smoothly using Clothwarp instead of simulation. A desirable shape could similarly be blended backwards or at other points in time if its pose was preferable. This proved useful in dealing with many cases of jitter and ooze while still preserving a simulated shape that did not require re-simulating. Furthermore another garment could be used as a projection target instead of the character mesh, which often provided a better surface when dealing with the many layers of garments.

Method 500 of FIG. 5 ends in step 560.

Accordingly, Clothwarp assists garment animation through methods of cloth articulation and simulation targeting. Clothwarp grants another level of directable control on simulation, allowing the artist to modify the influence of the warp, both as a target input into the simulation and as a cleanup tool on simulation results.

In some embodiments, instead of manually setting up multiple deformers to transform regions of a garment mesh, Clothwarp uses a single subdivision warp deformer to allow for all the deformations being applied to a character's skin surface mesh to be inadvertently inherited into the garment mesh. With this method the garment mesh followed the character mesh more precisely and provided an excellent simulation target for stabilization, jitter reduction and anti-oozing.

In one aspect, Clothwarp was also used in post-simulation editing. After a simulation was run, the artist still had the capability to blend the results of specific regions of a garment mesh between the simulation or the Clothwarp. This greatly increased the speed of miscellaneous shot cleanup, when the artist might have otherwise needed to designate a parameter adjustment and run a new simulation. In addition to the standard Clothwarp installed with all characters, a new Clothwarp could be generated in a per-shot context using the pose of the character and a garment's simulation results at a specific point in time. This enabled an artist to preserve the shape and wrinkles generated by simulation and progress it from that point forward smoothly using Clothwarp instead of simulation. A desirable shape could similarly be blended backwards or at other points in time if its pose was preferable. This proved useful in dealing with many cases of jitter and ooze while still preserving a simulated shape that did not require re-simulating. Furthermore another garment could be used as a projection target instead of the character mesh, which often provided a better surface when dealing with the many layers of garments.

In further embodiments, when simulating garment or hair animation, the simulator can produce undesirable results like jitter, oozing motion, or intersections. These artifacts can be very troublesome to fix, requiring hours of simulation parameter tweaking or manual deformation rigging on top of the simulation results, which can be especially tricky on a moving simulated object. The technique described here is a form of deformation rigging that reduces the amount of work usually required to achieve visually satisfying results.

In this technique, the simulation results of hair or of a garment from are projected to follow a separate target surface chosen by the user. This allows a user to take visually acceptable simulation results and reuse them at different times in the animation that exhibit undesired simulation artifacts. The animation of the target surface is transposed onto the simulation results with a subdivision warp deformer, allowing for seamless transition in time between simulated results and the new projected results. This target surface is typically the skin of a character, but can also be other simulated garments, which is particularly useful when dealing with multiple layers of cloth.

The problem of simulation artifacts can sometimes be resolved with the tweaking of the simulation parameters, but often takes several hours-long iterations. Manual rig deformations or filtering of simulation results can also be applied without requiring new simulation runs, but require careful tweaking to insure the static deformation works well on top of the moving simulation results.

This approach avoids the long iteration time of running a new simulation, taking seconds to compute. It also requires less manual tweaking than other forms of deformation rigging to produce desirable results.

Figure 6:
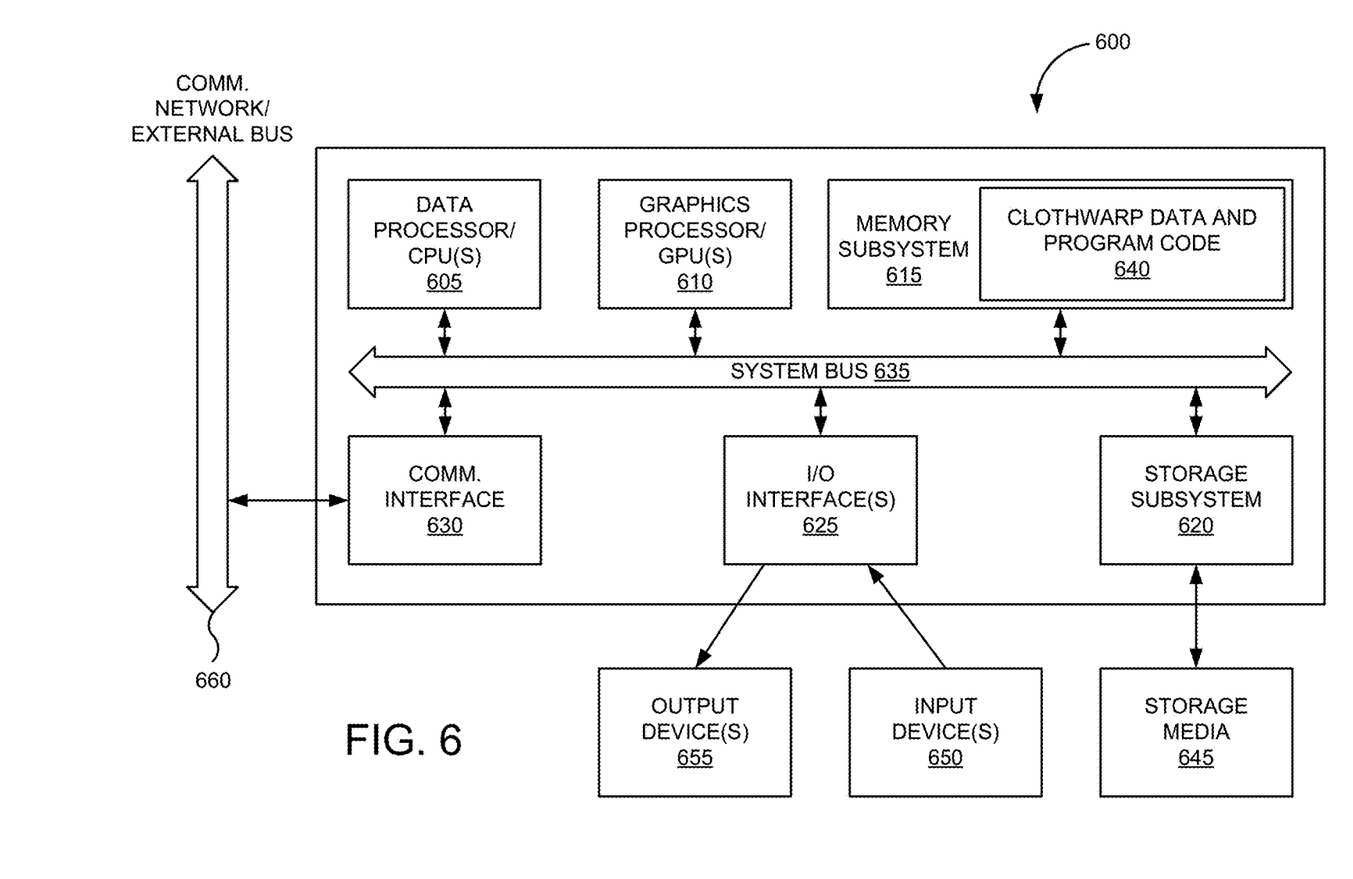
FIG. 6 is a block diagram of a computer system or information processing device that may incorporate an embodiment, be incorporated into an embodiment, or be used to practice any of the innovations, embodiments, and/or examples found within this disclosure.

FIG. 6 is a block diagram of computer system 600 that may incorporate an embodiment, be incorporated into an embodiment, or be used to practice any of the innovations, embodiments, and/or examples found within this disclosure. FIG. 6 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 600 can include hardware and/or software elements configured for performing logic operations and calculations, input/output operations, machine communications, or the like. Computer system 600 may include familiar computer components, such as one or more one or more data processors or central processing units (CPUs) 605, one or more graphics processors or graphical processing units (GPUs) 610, memory subsystem 615, storage subsystem 620, one or more input/output (I/O) interfaces 625, communications interface 630, or the like. Computer system 600 can include system bus 635 interconnecting the above components and providing functionality, such connectivity and inter-device communication. Computer system 600 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 605 can include hardware and/or software elements configured for executing logic or program code or for providing application-specific functionality. Some examples of CPU(s) 605 can include one or more microprocessors (e.g., single core and multi-core) or micro-controllers. CPUs 605 may include 4-bit, 8-bit, 12-bit, 16-bit, 32-bit, 64-bit, or the like architectures with similar or divergent internal and external instruction and data designs. CPUs 605 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 605 may also include one or more field-gate programmable arrays (FPGAs), application-specific integrated circuits (ASICs), or other microcontrollers. The one or more data processors or central processing units (CPUs) 605 may include any number of registers, logic units, arithmetic units, caches, memory interfaces, or the like. The one or more data processors or central processing units (CPUs) 605 may further be integrated, irremovably or moveably, into one or more motherboards or daughter boards.

The one or more graphics processor or graphical processing units (GPUs) 610 can include hardware and/or software elements configured for executing logic or program code associated with graphics or for providing graphics-specific functionality. GPUs 610 may include any conventional graphics processing unit, such as those provided by conventional video cards. Some examples of GPUs are commercially available from NVIDIA, ATI, and other vendors. In various embodiments, GPUs 610 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 610 may include any number of registers, logic units, arithmetic units, caches, memory interfaces, or the like. The one or more data processors or central processing units (CPUs) 605 may further be integrated, irremovably or moveably, into one or more motherboards or daughter boards that include dedicated video memories, frame buffers, or the like.

Memory subsystem 615 can include hardware and/or software elements configured for storing information. Memory subsystem 615 may store information using machine-readable articles, information storage devices, or computer-readable storage media. Some examples of these articles used by memory subsystem 670 can include random access memories (RAM), read-only-memories (ROMS), volatile memories, non-volatile memories, and other semiconductor memories. In various embodiments, memory subsystem 615 can include clothwarp data and program code 640.

Storage subsystem 620 can include hardware and/or software elements configured for storing information. Storage subsystem 620 may store information using machine-readable articles, information storage devices, or computer-readable storage media. Storage subsystem 620 may store information using storage media 645. Some examples of storage media 645 used by storage subsystem 620 can include floppy disks, hard disks, optical storage media such as CD-ROMS, DVDs and bar codes, removable storage devices, networked storage devices, or the like. In some embodiments, all or part of clothwarp data and program code 640 may be stored using storage subsystem 620.

In various embodiments, computer system 600 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 600 may also include one or more applications configured to execute, perform, or otherwise implement techniques disclosed herein. These applications may be embodied as clothwarp data and program code 640. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 615 and/or storage subsystem 620.

The one or more input/output (I/O) interfaces 625 can include hardware and/or software elements configured for performing I/O operations. One or more input devices 650 and/or one or more output devices 655 may be communicatively coupled to the one or more I/O interfaces 625.

The one or more input devices 650 can include hardware and/or software elements configured for receiving information from one or more sources for computer system 600. Some examples of the one or more input devices 650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 650 may allow a user of computer system 600 to interact with one or more non-graphical or graphical user interfaces to enter a comment, select objects, icons, text, user interface widgets, or other user interface elements that appear on a monitor/display device via a command, a click of a button, or the like.

The one or more output devices 655 can include hardware and/or software elements configured for outputting information to one or more destinations for computer system 600. Some examples of the one or more output devices 655 can include a printer, a fax, a feedback device for a mouse or joystick, external storage systems, a monitor or other display device, a communications interface appropriately configured as a transceiver, or the like. The one or more output devices 655 may allow a user of computer system 600 to view objects, icons, text, user interface widgets, or other user interface elements.

A display device or monitor may be used with computer system 600 and can include hardware and/or software elements configured for displaying information. Some examples include familiar display devices, such as a television monitor, a cathode ray tube (CRT), a liquid crystal display (LCD), or the like.

Communications interface 630 can include hardware and/or software elements configured for performing communications operations, including sending and receiving data. Some examples of communications interface 630 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 630 may be coupled to communications network/external bus 680, such as a computer network, to a FireWire bus, a USB hub, or the like. In other embodiments, communications interface 630 may be physically integrated as hardware on a motherboard or daughter board of computer system 600, may be implemented as a software program, or the like, or may be implemented as a combination thereof.

In various embodiments, computer system 600 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 600.

As suggested, FIG. 6 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for animating computer-generated objects, the method comprising:

receiving, at one or more computer systems, first position information generated by a first computer simulation of a first object at a first time of an animation sequence, the first object comprising a first mesh, wherein the first computer simulation is performed using one or more physics models, and wherein the first position information specifies a first position of a point of the first mesh;

receiving, at one or more computer systems, second position information associated with a second object at a plurality of times that include the first time and a second time, the second object comprising a second mesh;

projecting, with one or more processors associated with the one or more computer systems, the first position information of the first mesh to follow the second position information of the second mesh at the second time to generate projected position information of the first object at the second time of the animation sequence, wherein the projected position information specifies a second position of the point of the first mesh;

after the following of the second position provides completed results to obtain the projected position information, performing a second computer simulation of the first object using the projected position information as input to direct the second computer simulation, the second computer simulation providing new position information of the first object at the second time, wherein the second computer simulation is performed using the one or more physics models that were used in the first computer simulation, and wherein the new position information specifies a third position of the point of the first mesh; and generating, with the one or more processors associated with the one or more computer systems, the animation sequence at the plurality of times using the first position information and the new position information of the first object.

2. The method of claim 1 further comprising:

selectively blending, with the one or more processors associated with the one or more computer systems, at least some of the projected position information associated with the first object at the first time with at least some of the new position information associated with the first object at the second time.

3. The method of claim 1 further comprising:

retargeting, with the one or more processors associated with the one or more computer systems, a rest state of the first object at the second time of the animation sequence based on at least some of the first position information associated with the first object at the first time.

4. The method of claim 1 further comprising:

receiving, at one or more computer systems, third position information associated with the first object that is generated by the second computer simulation of the first object at a third time of the animation sequence based on the new position information associated with the first object at the second time.

5. The method of claim 4 further comprising:

blending, with the one or more processors associated with the one or more computer systems, at least some of the third position information associated with the first object at the third time with at least some the new position information associated with the first object at the second time.

6. The method of claim 1 wherein receiving the second position information associated with the second object comprises receiving position information associated with a deformation of the second object driven by a third object that also drives motion of the first object during the first computer simulation.

7. The method of claim 1 wherein the first object represents cloth.

8. The method of claim 1 wherein the first object represents hair or fur.

9. The method of claim 1 wherein the first object represents a surface of a liquid.

10. The method of claim 1 further comprising:

generating a third mesh by modifying the second mesh, wherein the third mesh includes modified position information corresponding to the second position information of the second mesh, wherein the second position information used for projecting is the modified position information.

11. The method of claim 10, wherein at least a portion of the modified position information is a simplification of at least a portion of the second position information of the second mesh.

12. The method of claim 1, wherein projecting preserves one or more shapes generated by the first simulation while progressing the point to the second position, and wherein the one or more shapes are associated with the point.

13. A non-transitory computer-readable medium storing computer-executable code for animating computer-generated objects, the non-transitory computer-readable medium comprising:

code for receiving first position information generated by a first computer simulation of a first object at a first time of an animation sequence, the first object comprising a first mesh, wherein the first computer simulation is performed using one or more physics models, and wherein the first position information specifies a first position of a point of the first mesh;

code for receiving second position information associated with a second object at a plurality of times that include the first time and a second time, the second object comprising a second mesh;

code for projecting the first position information of the first mesh to follow the second position information of the second mesh at the second time to generate projected position information of the first object at the second time of the animation sequence, wherein the projected position information specifies a second position of the point of the first mesh;

code for, after the following of the second position provides completed results to obtain the projected position information, performing a second computer simulation of the first object using the projected position information as input, the second computer simulation providing new position information of the first object at the second time, wherein the second computer simulation is performed using the one or more physics models that were used in the first computer simulation, and wherein the new position information specifies a third position of the point of the first mesh; and code for generating the animation sequence at the plurality of times using the first position information and the new position information of the first object.

14. The non-transitory computer-readable medium of claim 13 further comprising:

code for blending at least some of the first position information associated with the first object at the first time with at least some of the new position information associated with the first object at the second time.

15. The non-transitory computer-readable medium of claim 13 further comprising:

code for receiving third position information associated with the first object that is generated by the first computer simulation of the first object at a third time of the animation sequence based on the new position information associated with the first object at the second time.

16. The non-transitory computer-readable medium of claim 15 further comprising:

code for blending at least some of the third position information associated with the first object at the third time with at least some the new position information associated with the first object at the second time.

17. The non-transitory computer-readable medium of claim 13 wherein receiving the second position information associated with the second object comprises receiving position information associated with a deformation of the second object driven by a third object that also drives motion of the first object during the first computer simulation.

18. The non-transitory computer-readable medium of claim 13 wherein the first object represents cloth.

19. The non-transitory computer-readable medium of claim 13 wherein the first object represents hair or fur.

20. The non-transitory computer-readable medium of claim 13 wherein the first object represents a surface of a liquid.

21. A method for simulating computer-generated cloth, the method comprising:

receiving, at one or more computer systems, simulation results for a cloth mesh at a first time, wherein a first computer simulation that created the simulation results used one or more physics models, and wherein the simulation results specifies a first position of a point of the cloth mesh;

receiving, at one or more computer systems, a reference mesh;

receiving, at one or more computer systems, reference motion associated with the reference mesh from the first time to a second time;

projecting, with one or more processors associated with the one or more computer systems, the simulation result to follow the reference motion associated with the reference mesh at a second time to generate projection results for the cloth mesh at the second time, wherein the projection results specifies a second position of the point of the cloth mesh;

after the following of the reference motion provides completed results to obtain the projection results, performing a second computer simulation of the cloth mesh using the projection results as input to direct the second computer simulation, the second computer simulation providing second simulation results of the cloth mesh at the second time, wherein the second computer simulation is performed using the one or more physics models that were used in the first computer simulation, and wherein the second simulation results specifies a third position of the point of the cloth mesh; and generating, with the one or more processors associated with the one or more computer systems, an animation sequence at the first time point and the second time point using the simulation results and the second simulation results of the cloth mesh first object.

* * * * *

UNITED STATES PATENT AND TRADEMARK OFFICE
CERTIFICATE OF CORRECTION

PATENT NO. : 9,659,396 B1  
APPLICATION NO. : 13/799602  
DATED : May 23, 2017  
INVENTOR(S) : Edwin Chang et al.

Page 1 of 1

It is certified that error appears in the above-identified patent and that said Letters Patent is hereby corrected as shown below:

In the Claims

In Column 15, Line 45, in Claim 5, after "with at least some" insert --of--, therefor.

In Column 16, Line 63, in Claim 16, after "with at least some" insert --of--, therefor.

In Column 18, Line 23, in Claim 21, after "of the cloth mesh" delete "first object", therefor.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*